Dec. 2, 1924.  
A. F. GERDES  
1,517,722  
FRICTION WHEEL DIFFERENTIAL GEAR  
Filed June 12, 1923
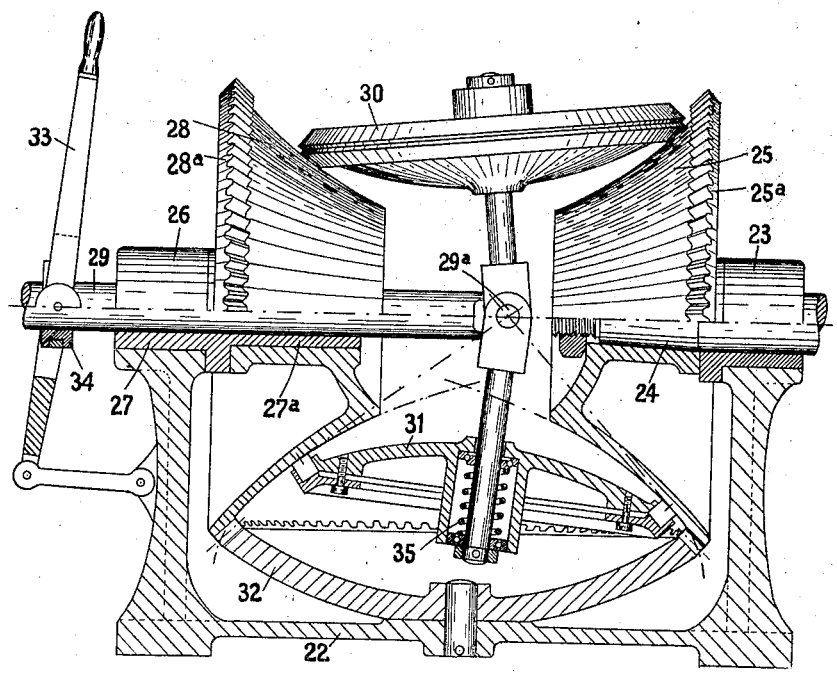
Adolf Friedrich Gerdes  
INVENTOR  
By  
his Attorney Patented Dec. 2, 1924.

1,517,722

UNITED STATES PATENT OFFICE.

ADOLF FRIEDRICH GERDES, OF BERLIN, GERMANY.

FRICTION-WHEEL DIFFERENTIAL GEAR.

Application filed June 12, 1923. Serial No 644,860.

*To all whom it may concern:*

Be it known that I, ADOLF FRIEDRICH GERDES, a citizen of the Republic of Germany, and residing in Berlin, Germany, have invented certain new and useful Improvements in Friction-Wheel Differential Gears (for which I have filed applications in Germany, Apr. 6, 1920; Sweden, May 3, 1923; Norway, May 4, 1923; and in Denmark, May 1, 1923), of which the following is a true, complete, and clear specification, reference being had to the accompanying drawings, forming part thereof.

The invention relates to a friction wheel differential gear with driving and driven friction wheels rotating on same or equivalent axle and revolvable transmission wheels interposed between the friction wheels, and in which the driving and the driven wheels are cone-shaped rotating bodies with concavely curved friction surfaces, the tangents to curved friction surfaces, the tangents to which at the points of contact between the transmission wheels and the friction wheels intersect each other on the middle axle of the driving and driven wheels or nearly at this axis.

In the embodiment illustrated, any desired directional or speed variations of the driven shaft are attainable. The driving wheel is coupled with the driven wheel to run in opposite direction with respect to it, the transmission wheels being mounted on spindles pivotally supported on the driven shaft, which is shiftable longitudinally.

The object of the invention is to reduce or entirely eliminate pernicious friction in friction wheel differential gears, to use same as coupling bodies and to evolve same into differential and reversing gears both with and without advantageously arranged pinion-wheel differential gears.

Referring to the annexed drawings,

Fig. 1 shows a lateral elevation of an embodiment partly in section.

Referring to the figure the driving shaft 24 is journalled in bearing 23 of the bottom plate 22, the driving friction wheel 25 being fastened to said shaft. The bushing 27 of the bearing 26 carries on the adjoined tube 27ª the friction wheel 28 which rotates freely. The power-receiving or driven shaft 29 journalled in bushing 27 carries the swinging transmission wheels 30 and 31 on its cross pivots 29ª which serve as lifters. The gears 28ª are connected with the friction wheel 28 and the gears 25ª with the friction wheel 25, the rotary motion of the driving friction wheel 25 being transmitted to friction wheel 28 in reverse direction. The power-receiving shaft 29 as a result of lever 33 and the flanged ring 34 can be moved to and fro axially, whereby the transmission wheels are swung in the direction of the axis and the power receiving shaft 29 is revolved more quickly or more slowly in either direction or brought to a standstill altogether according to their position. The pressure between the engaging surfaces can be maintained either by a spring 35 or by other appropriate means, such as by forcing the friction wheels 25 and 28 toward each other.

The friction surfaces of the friction wheels are formed by certain curves. The tangents indicated by dotted lines show that their length is constant as measured from the shaft axis, and this, together with the fact that the tangents at points of contact intersect at the pivotal support 29ª, insures a perfect rolling contact, regardless of the position of the transmission wheels. It is advisable to make the transmission wheels out of an elastic material and the friction wheels of a hard mass, in order that the elastic running surface of the friction wheels may run smoothly on a straight line, that is, in its entire breadth, adapting itself perfectly to the bevel rim of the transmission wheels.

Having now more fully described and ascertained the nature of my invention and in what manner the same is to be performed, I declare that what I claim is:—

1. A friction wheel differential gear comprising a driving shaft, an aligned driven shaft, a friction wheel mounted on the driving shaft and rotating therewith, a symmetrical second friction wheel loosely mounted on the driven shaft, the friction surfaces of said wheels being curved, means for rotating the second friction wheel in a direction opposite to the first, and differential means mounted on said driven shaft between said friction wheels and cooperating with the latter for producing desired directional and speed variations in the driven shaft, said differential means comprising oppositely disposed transverse spindles pivotally supported on the end of the driven shaft, and a transmission wheel loosely mounted on each of said spindles and having a beveled frictional edge surface engaging with the curved surfaces of the friction wheels.

2. A friction wheel differential gear as claimed in claim 1, including means for axially shifting the pivotal support of the spindles.

3. A friction wheel differential gear comprising a driving shaft, an aligned driven shaft, a friction wheel mounted on the driving shaft and rotating therewith, a symmetrical second friction wheel loosely mounted on the driven shaft, means for rotating the second friction wheel in a direction opposite to the first, and differential means mounted on said driven shaft between said friction wheels and cooperating with the latter for producing desired directional and speed variations in the driven shaft, the friction surfaces of the friction wheels being curved so that any tangent plane intersects the axis of the shaft at a fixed distance from the point of tangency.

4. A friction wheel differential gear as claimed in claim 1, in which the friction surfaces of the friction wheels are so curved that the tangent planes at the points of contact between the engaging surfaces always intersect the axis of the shaft at said pivotal support.

5. A friction wheel differential gear as claimed in claim 1, including resilient means on said spindles for retaining said transmission wheels in close contact with said frictional curved surfaces.

In testimony whereof I affix my signature.

ADOLF FRIEDRICH GERDES.